Feb. 7, 1961 C. O. FIELDS 2,970,635
CHAIR
Filed Nov. 28, 1958 5 Sheets-Sheet 1
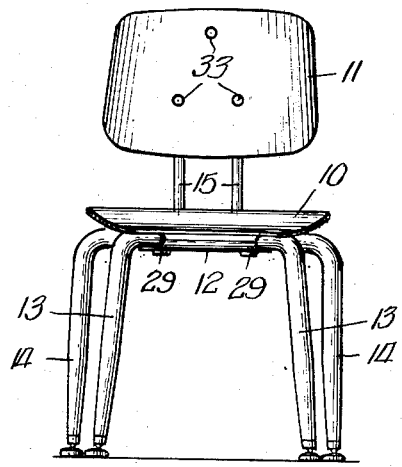
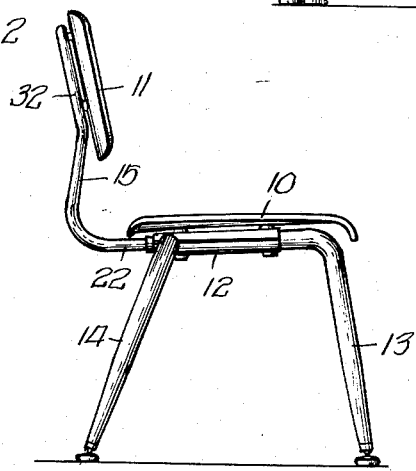
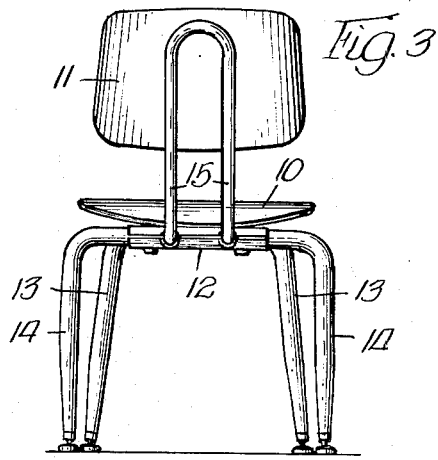
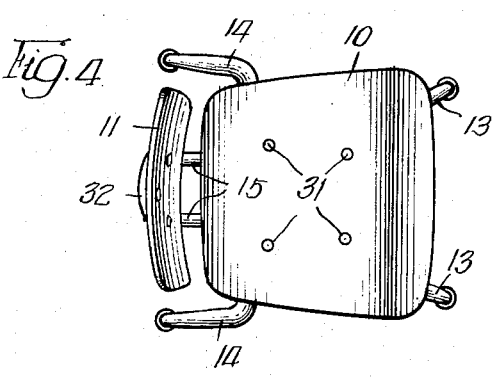
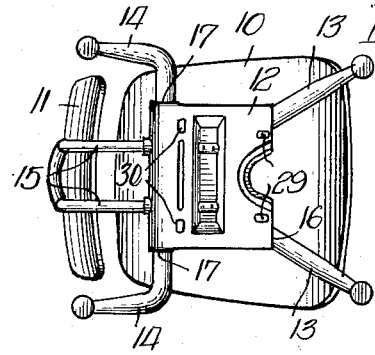
INVENTOR.
Clesent O. Fields,
BY
Cromwell, Greist & Warden
Attys Feb. 7, 1961 C. O. FIELDS 2,970,635
CHAIR
Filed Nov. 28, 1958 5 Sheets-Sheet 2
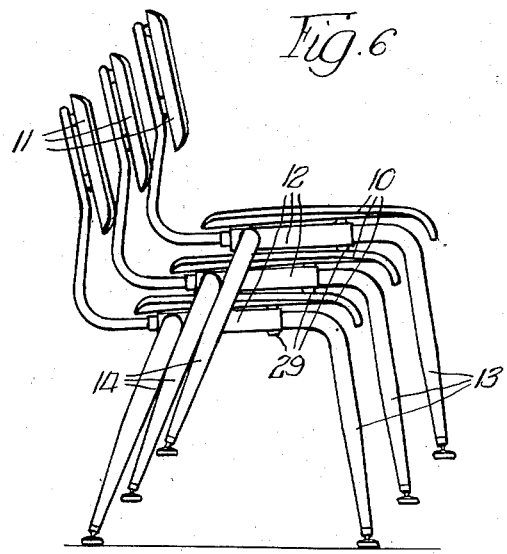
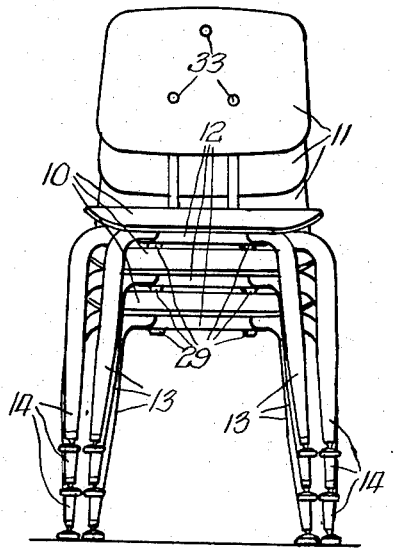
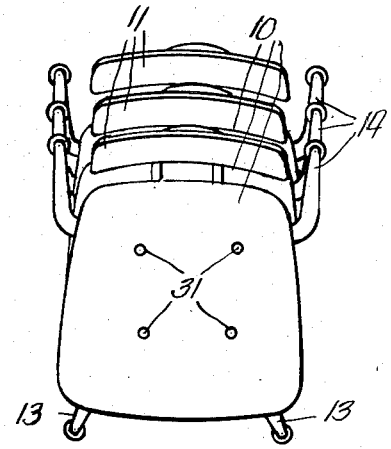
INVENTOR.
Clesent O. Fields,
BY
Cromwell, Greist & Warden
Attys

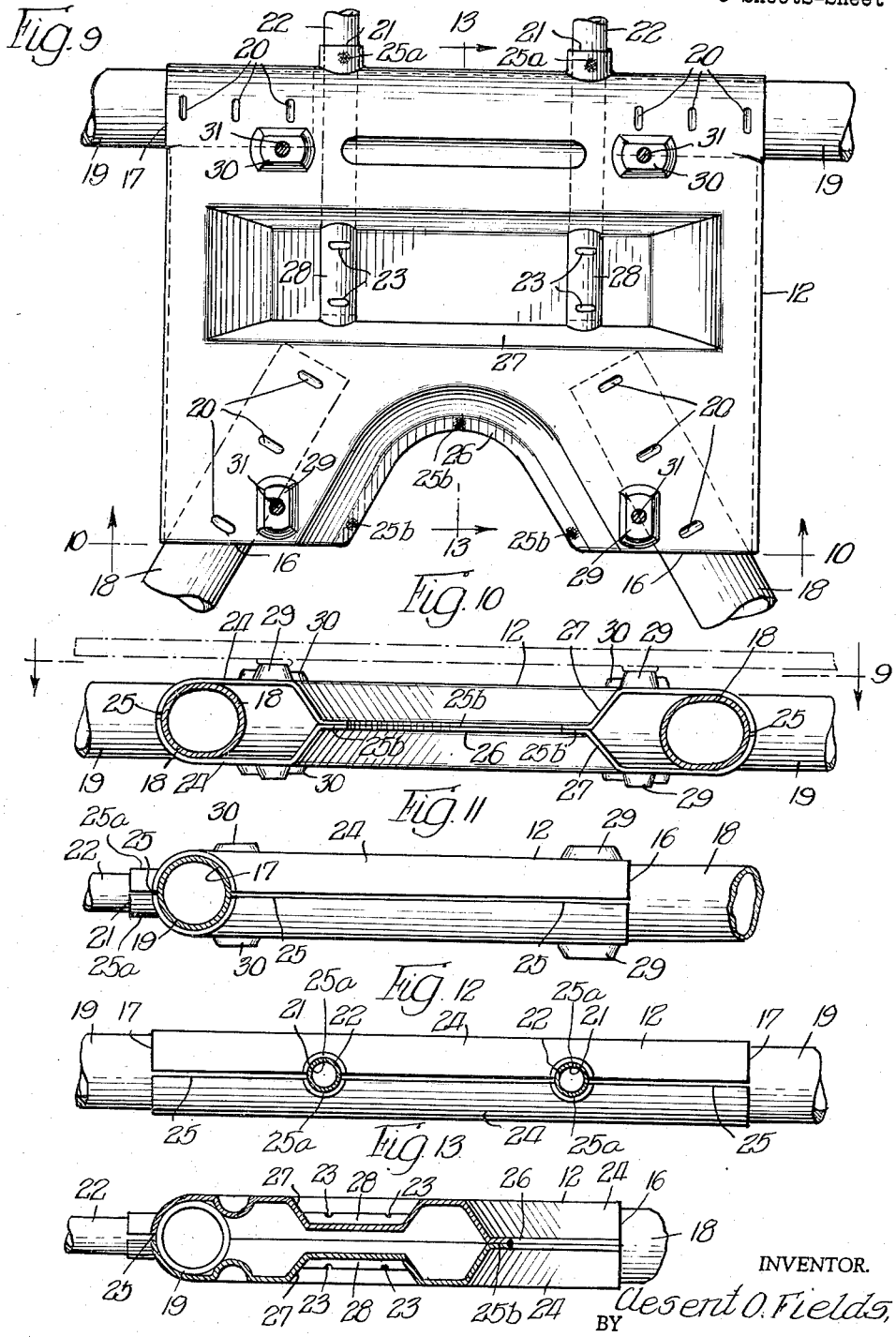

Feb. 7, 1961
C. O. FIELDS
2,970,635
CHAIR
Filed Nov. 28, 1958
5 Sheets-Sheet 4
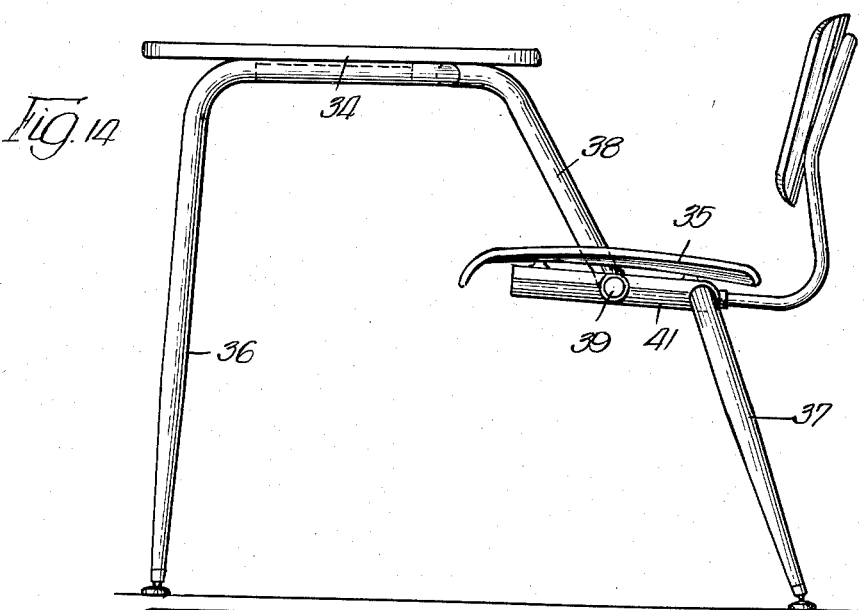
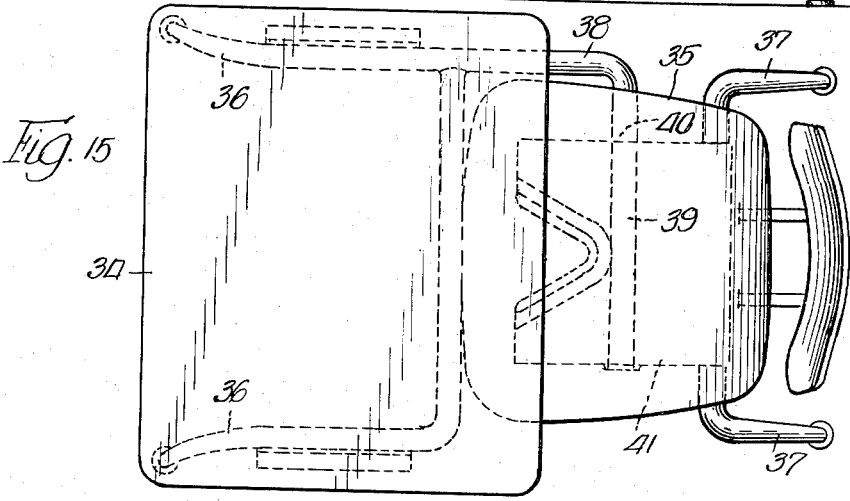
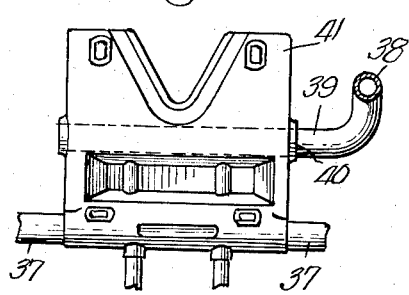
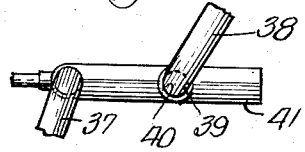
INVENTOR.
Clesent O. Fields
BY
Cromwell, Greist & Warden
Attys.

Feb. 7, 1961  C. O. FIELDS  2,970,635
CHAIR
Filed Nov. 28, 1958  5 Sheets-Sheet 5

INVENTOR.
Clesent O. Fields,
BY
Cromwell, Grist + Warden

United States Patent Office 2,970,635
Patented Feb. 7, 1961

2,970,635

CHAIR

Clesent O. Fields, New Castle, Ind., assignor to Peabody Seating Company, Inc., North Manchester, Ind., a corporation of Indiana Filed Nov. 28, 1958, Ser. No. 776,826

9 Claims. (Cl. 155—2)

This invention has to do with chairs of the type commonly used in schoolrooms, and is particularly concerned with the construction of the understructure, also with the arrangement of the legs.

The purpose of the invention is to provide a new and improved chair of the type described, which is of light, strong and rugged construction, will rest stably on the floor, is comfortable to sit in, occupies but little floor space, is inexpensive to manufacture, is attractive in appearance, and can be stacked easily and stably with a number of other chairs of the same construction when desired.

While the foregoing statement is indicative in a general way of the nature of the invention, other more specific objects and advantages will be apparent to those skilled in the art upon a full understanding of the several features disclosed.

Several embodiments of the invention are presented herein by way of exemplification but it will of course be appreciated that the invention is susceptible of incorporation in still other forms coming equally within the scope of the appended claims.

In the accompanying drawings:

Fig. 1 is a front view of a chair constructed in accordance with the invention;

Fig. 2 is a side view of the same;

Fig. 3 is a rear view of the same;

Fig. 4 is a top view of the same;

Fig. 5 is a bottom view of the same;

Fig. 6 is a side view showing several of the chairs stacked upon each other;

Fig. 7 is a front view of the stack;

Fig. 8 is a top view of the stack;

Fig. 9 is a top view of the understructure;

Fig. 10 is a front edge view of the same;

Fig. 11 is a side edge view of the same;

Fig. 12 is a rear edge view of the same;

Fig. 13 is a vertical section taken through the understructure, on approximately the line 13—13 of Fig. 9;

Fig. 14 is a side view of a combination unit in which the chair is structurally combined with a study top;

Fig. 15 is a top view of the combination shown in Fig. 14;

Fig. 16 is a fragmentary top view of the understructure of the same chair, with the seat panel removed, showing the manner in which the tube which supports the study top is secured to the understructure;

Fig. 17 is a fragmentary side view of the understructure shown in Fig. 16;

Figure 18:
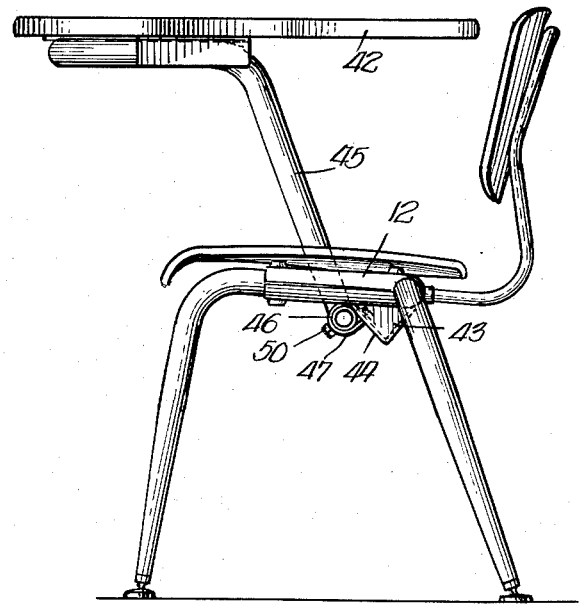
Fig. 18 is a side view of another combination unit in which the chair is structurally combined with a tablet arm.

The new chair is provided with a horizontal seat panel 10, an upright back panel 11, a horizontal understructure 12 to which the seat panel 10 is secured, forwardly and downwardly extending front legs 13, laterally and downwardly extending rear legs 14, and rearwardly and upwardly extending rods 15 to which the back panel 11 is secured. The seat and back panels 10 and 11 are preferably made of multi-ply hardwood or Fiberglas, while the understructure 12, the legs 13 and 14 and the rods 15 are of metal construction.

The understructure 12, the legs 13 and 14 and the rods 15 are connected together, preferably by welding, into a single rigid unit. The understructure 12 is preferably hollow and of generally rectangular form, and is provided adjacent its corners with horizontally facing openings 16 and 17. The front and rear legs 13 and 14 are of tubular downwardly swaged construction, and the upper ends 18 and 19 of the front and rear legs are bent horizontally and are secured to the understructure 12 within the openings 16 and 17, preferably by being spot welded to the interior surfaces of small indentations 20 in the top and bottom of the understructure. The thusly housed upper ends 18 and 19 of the front and rear legs extend a substantial distance into the understructure 12 from the openings 16 and 17.

The understructure 12 is also provided at its rear edge, inwardly from its side edges, with other relatively small horizontally facing openings 21. The rods 15 are also of tubular construction but are of smaller diameter than the legs. The lower horizontally extending ends 22 of the rods 15 are secured to the understructure 12 within such openings, preferably by being spot welded to the interior surfaces of other indentations 23 in the top and bottom of the understructure.

The understructure 12 is composed of two complementary top and bottom cup-shaped sheet metal stampings 24, which stampings are identical in shape and size and are cupped together with their confronting margins spaced slightly apart at 25, except at their front edges, and with the ends of the front and rear legs 13 and 14 and the rods 15 securely housed therebetween.

In addition to the welds at 20 and 23, the ends 22 of the rods 15 are preferably welded top and bottom to the stampings 24 at 25a, and welds 25b are also preferably provided between the stampings. The spacing referred to effectively eliminates creaking under the imposition of excessive stresses.

The front edge 26 of the understructure 12 may be advantageously curved rearwardly intermediate the front corner openings 16 in an arc, and the upper and lower faces of the understructure 12 are preferably provided with transversely extending recessed sections 27, the bottoms of which are provided with forwardly and rearwardly extending embossments 28 between which the front ends of the rods 15 fit. The upper and lower faces of the understructure 12 are also provided adjacent their front corners with upwardly and downwardly projecting lugs 29 and adjacent their rear corners with other upwardly and downwardly projecting lugs 30. The lugs 29 and 30 are apertured, and the seat panel 10 is attached to the upper face of the understructure 12 by fastenings 31, preferably in the form of rivets, which pass downwardly through the seat panel in the apertures in the lugs 29 and 30.

The upper ends 32 of the rods 15 come together behind the back panel 11 in the form of an inverted U, and the back panel 11 is attached to the same by rivets 33.

An important feature of the new chair is the arrangement of the front and rear legs 13 and 14, which permits several chairs of the same construction to be stacked vertically in a stable manner.

It will be noted that the rear legs 14 of the chair do not extend downwardly from beneath the rear corners of the seat panel 10 but instead extend first laterally an appreciable distance to points beyond the side edges of the rear portion of the seat panel and then extend downwardly, at a slight rearward inclination, in generally parallel as distinguished from divergent relation to each other. The front legs 13, on the other hand, extend downwardly at a slight forward inclination from points beneath the front corners of the seat panel. The rear portion of the seat panel 10 is preferably somewhat narrower than the front portion thereof.

In order to stack one chair on another the upper chair is positioned on the lower chair with its widespread rear legs 14 straddling and loosely embracing the rear portion of the seat panel 10 of the lower chair, and with its rear legs directly in front of and in engagement with the rear legs of the lower chair, with the lower portions of the rear legs of the upper chair inclined back under the upper portions of the rear legs of the lower chair, all as shown in Figs. 6 to 8, inclusive.

In this position of the upper chair the curved upper portions of the rear legs 14 of the upper chair rest on and index with the side edges of the rear portion of the seat panel 10 of the lower chair, and the downwardly projecting front lugs 29 on the underside of the understructure 12 of the upper chair rest on the front portion of the seat panel 10 of the lower chair, with the back panels 11 and their supporting rods of the two chairs spaced from each other, and with the front legs 13 of the two chairs depending freely, thereby affording a stable four-point support for the upper chair upon the lower one.

The chair which has been illustrated and described is a readily portable free-standing unit which can either be used alone or else drawn up and used with an associated desk, study top, table or other work surface member.

The chair may also be used by combining it structurally with a desk top, study top or similar member, as shown in Figs. 14 to 17, inclusive, in which a study top 34 is employed by way of exemplification. The rear legs of the study top member may be omitted and the front legs of the chair 35 may also be omitted, the combination being supported only on the front legs 36 of the study top and on the rear legs 37 of the chair. The necessary rigidity is obtained by employing cross-bracing means between the study top and the chair, located adjacent the far edge of the study top and the far edge of the chair. For this purpose a tube 38 may advantageously be employed. The tube 38 is secured in any suitable manner to the underside of the study top and extends downwardly and rearwardly in substantially the same plane as the far rear leg 37 of the chair and at approximately the same angle as that leg. The tube 38 is provided at its lower end with a laterally extending horizontal portion 39, which portion extends into a horizontally facing opening 40 in the far side of the hollow understructure 41 of the chair, where it is secured in place, preferably by welding.

Figure 19:
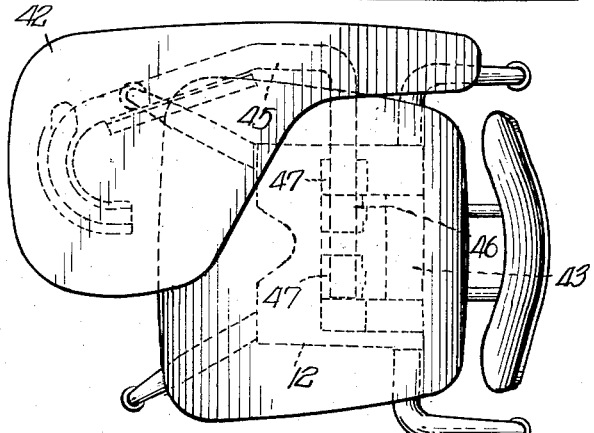
Fig. 19 is a top view of the combination shown in Fig. 18.
Figure 20:
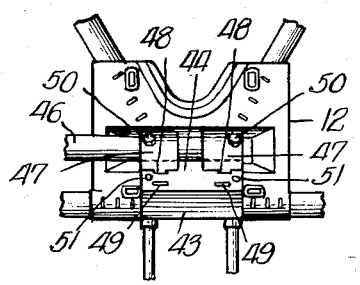
Fig. 20 is a fragmentary bottom view of the understructure of the chair shown in Fig. 19 showing the manner in which the tube which supports the tablet arm is adjustably connected with the bottom of the understructure.
Figure 21:
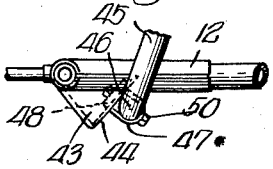
Fig. 21 is a fragmentary side view of the understructure illustrated in Fig. 20, showing the adjustable connection.

The chair may also be used as a tablet arm chair by structurally combining with the chair a tablet arm 42, as shown for example in Figs. 18 to 21, inclusive, and the tablet arm can be made vertically adjustable if desired. For this purpose an additional stamping 43 of generally triangular form, having a downwardly and rearwardly inclined front face 44, can be secured to the lower face of the understructure 12 of the chair shown in Figs. 1 to 13, inclusive, and a tube 45, which is secured to the underside of the tablet arm 42 and which extends downwardly and rearwardly from the tablet arm adjacent the far edge of the latter, is provided at its lower end with a laterally extending horizontal portion 46, which portion extends beneath the understructure 12 in parallel relation to the front edge of the latter. The horizontal portion 46 of the tube 45 has two U-shaped fittings 47 secured thereto, preferably by welding, and the edges of the fittings are formed with small projecting tongues 48 which extend into and interfit with sets of slots 49 in the inclined face 44 of the stamping 43. The inclined face 44 of the stamping preferably contains two or three sets of slots 49, at different elevations, in order to permit the tube 45 to be adjusted in position either upwardly and forwardly or downwardly and rearwardly to change the elevation and position of the tablet arm relative to the chair. After the tongues 48 have been fitted into one of the sets of slots 49 the tube 45 is rigidly clamped in position by means of two cap screws 50 which extend through apertures in the fitting 47 and screw into tapped openings 51 associated with the particular set of slots employed.

If it is desired to make the study top 45 of the combination unit shown in Figs. 14 to 17, inclusive, vertically and forwardly and rearwardly adjustable with respect to the chair 35 employed in association therewith, the above described type of adjustable connection can be employed for that purpose, in which event the elevation of the front portion of the study top 34 can be correspondingly changed by raising or lowering the front portion with respect to the front legs 36 by any suitable means.

Where the chair is incorporated in a combination unit of any sort, or where it is used alone but is not intended for stacking, the four downwardly projecting apertured lugs 29 and 30 on the bottom of the understructure 12 may be conveniently utilized for the purpose of bolting or riveting an underslung bookrack in place.

I claim:

1. In a chair of the type having a seat, a back, and an understructure for supporting the seat and back, a horizontally disposed box-like bracket of hollow generally rectangular form which is provided adjacent its corners with four horizontally facing openings, with the front openings spaced substantially from the rear openings, tubular front and rear legs which extend downwardly from the bracket and which are provided with horizontally bent upper ends which are rigidly secured to the bracket within said front and rear openings, said bracket being also provided in its rear edge inwardly of its side edges with two other openings, tubular rods which extend first rearwardly and then upwardly and are rigidly secured at their lower ends to the bracket within said other openings, a seat panel secured to the upper face of the bracket, and a back panel secured to the upper ends of the rods, said hollow bracket consisting of two complementary top and bottom cup-shaped sheet metal stampings, which stampings are substantially identical in shape and size, are cupped together, and are secured together with their margins in confronting relation, with the horizontally bent upper ends of the front and rear legs and the horizontally extending front portions of the rods housed therebetween and rigidly secured thereto.

2. In a chair of the type having a seat, a back, and an understructure for supporting the seat and back, a horizontally disposed box-like bracket of hollow generally rectangular form which is provided adjacent its corners with four horizontally facing openings, tubular front and rear legs which extend downwardly from the bracket and which are provided with horizontally bent upper ends which are rigidly secured to the upper and lower walls of the bracket within said openings, said bracket being also provided in its rear edge inwardly of its side edges with two other openings, tubular rods which extend first rearwardly and then upwardly and are secured at their lower ends to the bracket within said other openings, a seat panel secured to the upper face of the bracket, and a back panel secured to the upper ends of the rods, said hollow bracket being provided adjacent the corners of its upper face with upwardly projecting lugs which space the seat panel from the bracket, and fasteners for attaching the seat panel to the lugs.

3. In a chair of the type having a seat, a back, and an understructure for supporting the seat and back, a horizontally disposed box-like bracket of hollow generally rectangular form which is provided adjacent its corners with four horizontally facing openings, with the front openings spaced substantially from the rear openings, tubular front and rear legs which extend downwardly from the bracket and which are provided with horizontally bent upper ends which are rigidly secured to the upper and lower walls of the bracket within said openings, said bracket being also provided in its rear edge inwardly of its side edges with two other openings, tubular rods which extend first rearwardly and then upwardly and are rigidly secured at their lower ends to the upper and lower walls of the bracket within said other openings, a seat panel secured to the upper face of the bracket, and a back panel secured to the upper ends of the rods, the horizontally bent upper ends of the front legs being positioned angularly within the bracket in rearwardly converging relation to each other, and the horizontally bent upper ends of the rear legs being positioned transversely within the bracket in axial alignment with each other.

4. In a chair of the type having a seat, a back, and an understructure for supporting the seat and back, a horizontally disposed box-like bracket of hollow generally rectangular form which is provided adjacent its coners with four horizontally facing openings, with the front openings spaced substantially from the rear openings, tubular front and rear legs which extend downwardly from the bracket and which are provided with horizontally bent upper ends which are rigidly secured to the bracket within said openings, said bracket being also provided in its rear edge inwardly of its side edges with two other openings, tubular rods which extend first rearwardly and then upwardly and are rigidly secured at their lower ends to the bracket within said other openings, a seat panel secured to the upper face of the bracket, and a back panel secured to the upper ends of the rods, the horizontally bent upper ends of the front legs being positioned angularly within the bracket in rearwardly converging relation to each other, the horizontally bent upper ends of the rear legs being positioned transversely within the bracket in axial alignmen. with each other, and the horizontally extending lower ends of the rods being positioned within the bracket rearwardly of the upper ends of the front legs and between the upper ends of the rear legs in parallel relation to each other.

5. In a chair of the type having a seat, a back, and an understructure for supporting the seat and back, a horizontally disposed box-like bracket of hollow generally rectangular form which is provided adjacent its corners with four horizontally facing openings, tubular front and rear legs which extend downwardly from the bracket and which are provided with horizontally bent upper ends which are rigidly secured to the bracket within said openings, said bracket being also provided in its rear edge inwardly of its side edges with two other openings, tubular rods which extend first rearwardly and then upwardly and are rigidly secured at their lower ends to the bracket within said other openings, a seat panel secured to the upper face of the bracket, and a back panel secured to the upper ends of the rods, the horizontally bent upper ends of the front legs being positioned angularly within the bracket in rearwardly converging relation to each other, the horizontally bent upper ends of the rear legs being positioned transversely within the bracket in axial alignment with each other, the horizontally extending lower ends of the rods being positioned within the bracket rearwardly of the upper ends of the front legs and between the upper ends of the rear legs in parallel relation to each other, and the front edge of the bracket being curved rearwardly between the upper ends of the front legs.

6. In a chair of the type having a seat and an understructure for supporting the seat, a horizontally disposed box-like bracket of generally rectangular form which is characterized by vertically spaced horizontally extending upper and lower walls and is provided adjacent its corners with four horizontally facing openings, with the front openings spaced substantially from the rear openings, separate tubular front legs and separate tubular rear legs which extend downwardly from the bracket and which are provided with horizontally bent upper ends which are of subsantially the same diameter as the height of the inside of the bracket and which extend through said openings and are rigidly secured within the bracket to the upper and lower walls of the same at a plurality of points spaced longitudinally of the horizontally bent upper ends of the legs, and a seat secured to the upper surface of the upper wall of the bracket.

7. In a chair of the type which is adapted to stack with other chairs of the same construction, a seat panel, a bracket to which the seat panel is secured, front legs which are secured to the bracket and extend downwardly from points beneath the front corners of the seat panel, and rear legs which are secured to the bracket and extend first laterally to points beyond the side edges of the rear portion of the seat panel and then extend downwardly and rearwardly, said bracket, when the chair is stacked upon another chair of the same construction, bearing on the front portion of the top of the underlying seat panel of the lower chair, with the rear legs of the chair straddling and embracing the side edges of the underlying seat panel in front of and in engagement with the front sides of the rear legs of the lower chair.

8. In a chair of the type which is adapted to stack with other chairs of the same construction, a seat panel having a rear portion which is reduced in width with respect to its front portion, a horizontally disposed hollow bracket to which the seat panel is secured, tubular front legs which are housed at their upper ends within and secured to the bracket and which extend downwardly from points beneath the front corners of the seat panel, and tubular rear legs which are housed at their upper ends within and secured to the bracket and which extend first laterally to points beyond the side edges of the reduced rear portion of the seat panel and then extend downwardly and rearwardly in generally parallel relation, said bracket, when the chair is stacked upon another chair of the same construction, bearing on the front portion of the underlying seat panel of the lower chair, with the chair in forwardly offset relation to the lower chair, with said rear legs of the chair straddling and embracing the side edges of the reduced rear portion of the underlying seat panel in front of and in engagement with the front sides of the rear legs of the lower chair.

9. In a chair of the type which is adapted to stack with other chairs of the same construction, a seat panel having a rear portion which is reduced in width with respect to its front portion, a horizontally disposed hollow bracket to which the seat panel is secured, tubular front legs which are housed at their upper ends within and secured to the bracket and which extend first forwardly and laterally at an angle and then forwardly and downwardly from points beneath the front corners of the seat panel, and tubular rear legs which are housed at their upper ends within and secured to the bracket and which extend first laterally to points beyond the side edges of the reduced rear portion of the seat panel and then extend downwardly and rearwardly in generally parallel relation, with the rear legs more widely spaced than the front legs, said bracket, when the chair is stacked upon another chair of the same construction, bearing on the front portion of the underlying seat panel of the lower chair, with the upper chair in forwardly offset relation to the lower chair, and with the front legs of the upper chair clear of the underlying seat panel and front leg of the lower chair, and with the rear legs of the upper chair straddling and embracing and supported on the side edges of the reduced rear portion of the underlying seat panel of the lower chair in front of and in engagement with the front sides of the rear legs of the lower chair.

References Cited in the file of this patent

UNITED STATES PATENTS

| | | |
|---|---|---|
| 2,184,173 | Bargen | Dec. 19, 1939 |
| 2,362,426 | Wyatt | Nov. 7, 1944 |
| 2,570,301 | Adsit | Oct. 9, 1951 |
| 2,699,814 | Kahn | Jan. 18, 1955 |
| 2,711,210 | Henrikson | June 21, 1955 |
| 2,722,965 | Chapman | Nov. 8, 1955 |
| 2,747,654 | Chapman | May 29, 1956 |
| 2,790,486 | Hardie | Apr. 30, 1957 |
| 2,876,825 | Boortz | Mar. 10, 1959 |